(12) United States Patent
Tahara et al.

(10) Patent No.: US 11,801,797 B2
(45) Date of Patent: Oct. 31, 2023

(54) VEHICLE BODY SIDE PART STRUCTURE

(71) Applicant: HONDA MOTOR CO., LTD., Tokyo (JP)

(72) Inventors: Daiki Tahara, Tokyo (JP); Kenji Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/669,012

(22) Filed: Feb. 10, 2022

(65) Prior Publication Data

US 2022/0266771 A1 Aug. 25, 2022

(30) Foreign Application Priority Data

Feb. 24, 2021 (JP) .................................. 2021-027402

(51) Int. Cl.
*B60R 13/08* (2006.01)
*B62D 25/04* (2006.01)
*B62D 25/02* (2006.01)

(52) U.S. Cl.
CPC ........ *B60R 13/0815* (2013.01); *B62D 25/025* (2013.01); *B62D 25/04* (2013.01)

(58) Field of Classification Search
CPC . B60R 13/0815; B60R 13/0823; B62D 25/04; B62D 25/025; B62D 27/023
USPC ....................................... 296/193.06, 187.02
See application file for complete search history.

(56) References Cited

U.S. PATENT DOCUMENTS 10,625,786 B2 4/2020 Marukawa et al.
2020/0307706 A1 10/2020 Honko

FOREIGN PATENT DOCUMENTS

| JP | 6581623 B2 | 9/2019 | |
| JP | WO2020170811 A1 * | 8/2020 | ............. B62D 25/04 |
| JP | 2020-163948 A | 10/2020 | |
| WO | 2020170811 A1 | 8/2020 | |

OTHER PUBLICATIONS

Japanese Office Action received in corresponding Japanese application No. 2021-027402 dated Sep. 6, 2022 with English translation (12 pages).

* cited by examiner

*Primary Examiner* — Dennis H Pedder
(74) *Attorney, Agent, or Firm* — Rankin, Hill & Clark LLP

(57) ABSTRACT

A vehicle body side part structure includes: a center pillar having a base expanding in a fan shape; an inner center pillar having filling openings formed in vicinity to front and rear inwardly-curved corners of the base; a center pillar stiffener defining a filled space to extend in a front-rear direction between the center pillar stiffener and inner center pillar; a side sill joined to lower ends of the inner center pillar and center pillar stiffener; and a partition member having front and rear cover portions and a main body integrated with the cover portions. The partition member includes a filled space partitioner to partition the filled space into a first filled space located closer to one of the inwardly-curved corners and a second filled space located closer to the other of the inwardly-curved corners so as to have a volume substantially equal to that of the first filled space.

10 Claims, 11 Drawing Sheets

VEHICLE BODY SIDE PART STRUCTURE

CROSS-REFERENCE TO RELATED APPLICATION

This application claims the benefit of priority to Japanese Patent Application No. 2021-027402 filed on Feb. 24, 2021, the disclosures of all of which are hereby incorporated by reference in their entireties.

TECHNICAL FIELD

The present invention relates to a vehicle body side part structure.

BACKGROUND OF THE INVENTION

Conventionally known as a structure for improving the soundproof property of a vehicle body is a vehicle body side part structure described in Japanese Patent No. 6581623 B2 in which a foaming agent and a partition member are provided in a closed section such as a center pillar. The vehicle body side part structure (A) described in Japanese Patent No. 6581623 B2 is configured such that the partition member (4) folded into two halves is inserted into the hollow section (3a) through the interior opening (32a) of the center pillar (3), and then the partition member (4) is unfolded for installation in the hollow section (3a).

The partition member (4) is installed in the hollow section (3a) to define a filled space (3b). The filled space (3b) is filled with a forming agent through the filling openings (32b, 32c) for sealing and blocking.

SUMMARY

With the vehicle body side part structure (A) of JP 6581623 B2, in a case where the partition member (4) is provided at a lower portion within the center pillar (3), the foaming agent filled through one filling opening (32b) flows toward the other filling opening (32c). Therefore, the vehicle body side part structure (A) of JP 6581623 B2 has a problem that the foaming agent is not filled in every corner of the filled space (3b).

The present invention has been made to solve the above problem, and is intended to provide a vehicle body side part structure to allow an infill to fill every corner of a filled space to improve a soundproof property of a vehicle body.

In order to solve the above-identified problem, a vehicle body side part structure according to the present invention includes: a center pillar having a base expanding in a fan shape; an inner panel partly forming the center pillar and having filling openings formed in vicinity to front and rear inwardly-curved corners of the base; a center pillar stiffener partly forming the center pillar, disposed exterior to the inner panel, and defining a filled space to extend in a front-rear direction between the center pillar stiffener and the inner panel; a side sill joined to lower ends of the inner panel and the center pillar stiffener; and a partition member disposed above the side sill in the filled space and having front and rear cover portions to face the filling openings and a main body integrated with the cover portions, wherein the partition member includes a filled space partitioner to partition the filled space into a first filled space located closer to one of the inwardly-curved corners and a second filled space located closer to the other of the inwardly-curved corners so as to have a volume substantially equal to that of the first filled space.

The present invention provides a vehicle body side part structure to allow an infill to fill every corner of a filled space to improve a soundproof property of a vehicle body.

DETAILED DESCRIPTION

Figure 1:
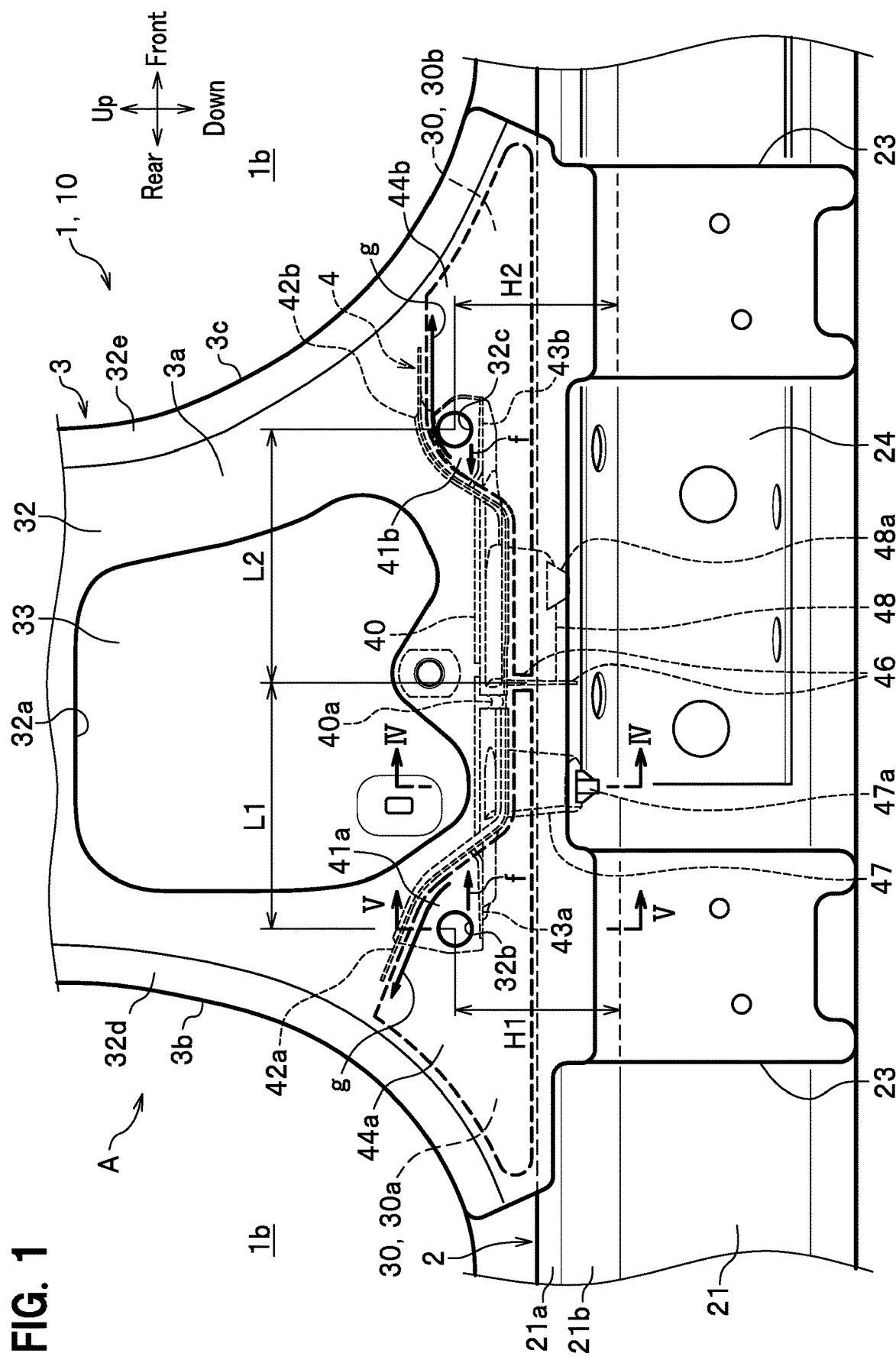
FIG. 1 is a schematic side view of a vehicle body side part structure according to an embodiment of the present invention, to show main parts at a lower portion of a center pillar.

A vehicle body side structure A according to an embodiment of the present invention is described, with reference to FIGS. 1 to 9. In the embodiment, the same elements are denoted by the same reference numerals, and duplicate descriptions thereof are omitted. Note that, in the embodiment of the present invention, "front" means a direction of a vehicle moving forward, "rear" means a direction of the vehicle moving rearward, "up" means a vertically upper side, "down" means a vertically lower side, and "right-left" means a vehicle width direction.

<<Vehicle>>

First, before description of a vehicle body side part structure A according to an embodiment of the present invention, a description is given of a vehicle to which the present invention is applied. A type, a shape, and the like of the vehicle are not particularly limited, as long as the vehicle includes a hollow vehicle body frame 10 into which an infill such as a foaming agent can be injected in a closed section, as shown in FIG. 1. Hereinafter, a passenger car including a center pillar 3 is described as an example of a vehicle including the hollow vehicle body frame 10.

<<Vehicle Body Side Part Structure>>

The vehicle body side part structure A is a structure to form right and left vehicle body sides 1a (see FIG. 4) of a vehicle body 1. The vehicle body side part structure A includes a side sill 2, the center pillar 3, a filled space 30 to have a situation of the center pillar 3 (vehicle body frame 10) filled with an infill, and a partition member 4 to define the filled space 30. A door opening 1b opened and closed by a side door (not shown) is formed in front of and behind the center pillar 3 at a central portion in the front-rear direction of the vehicle body side 1a (see FIG. 4).

Note that the vehicle body side 1a (see FIG. 4) of the vehicle body 1 is formed substantially bilaterally symmetrical, and thus a description is mainly given of a left one, and a description of a right one is omitted.

<<Side Sill>>

In addition, the side sill 2 may be a linear hollow frame member extending in the front-rear direction, or may be a hollow frame formed in an inverted T shape in side view, and a case of the side sill 2 being a linear hollow frame member is described below, as an example.

Figure 4:
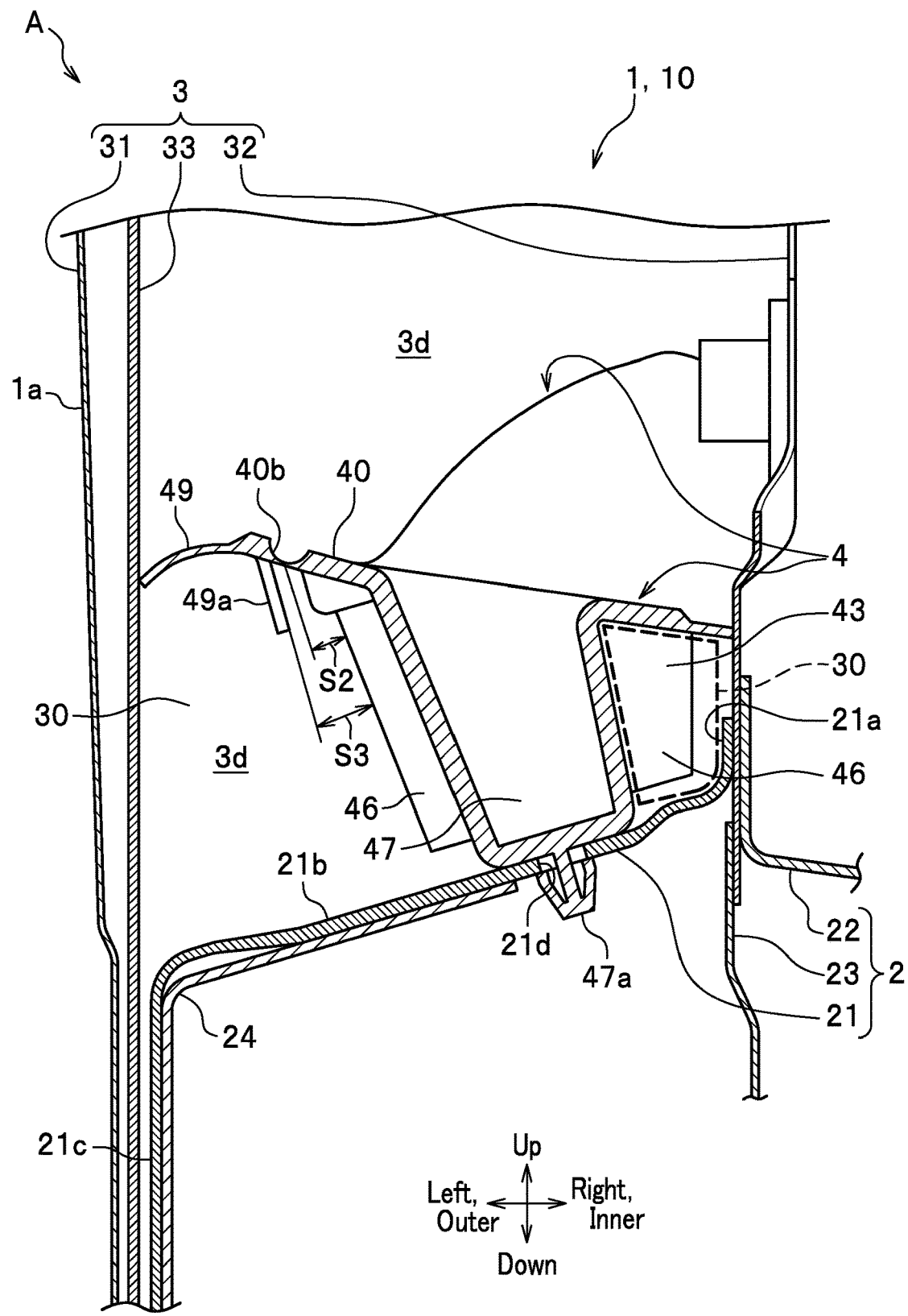
FIG. 4 is an enlarged cross-sectional view, taken along a line IV-IV in FIG. 1.

As shown in FIG. 1, the side sill 2 is a hollow frame member disposed in the lower portion of the vehicle body and extending in the front-rear direction. As shown in FIG. 4, the side sill 2 includes an outer side sill 21, an inner side sill 22, and reinforcing members 23, 24, 25. A lower end of the center pillar 3 is installed in an upper portion of the side sill 2 so as to be orthogonal to each other (see FIG. 1).

In addition, the partition member 4 is mounted on an upper face of the side sill 2. A lower portion of an inner center pillar 32 is joined to the side sill 2, between two metal plates of the outer side sill 21 having a substantially U-shape (substantially inverted U-shape) in cross section in front view and the inner side sill 22 having a substantially symmetrical shape with the outer side sill 21. The reinforcing member 23 is disposed between the outer side sill 21 and the inner side sill 22 so as to define two closed sections on the right and left sides in the cylindrical side sill 2. The side sill 2 has a cross member, a floor panel, and the like (which are not shown) connected thereto on an inner side in the vehicle width direction thereof.

<Outer Side Sill>

As shown in FIG. 4, the outer side sill 21 is a member forming a half body on the outer side in the vehicle width direction of the side sill 2 formed into a substantially tubular shape. The outer side sill 21 and the inner side sill 22 are formed, for example, by pressing a flat plate member made of metal such as high-tensile steel. The outer side sill 21 includes flange portions 21a formed at upper and lower ends, an upper face portion 21b and a lower face portion (not shown) extending outward in the vehicle width direction from base ends of the flange portions 21a, and an outer face portion 21c formed between the upper face portion 21b and the lower face portion (not shown).

The outer side sill 21 (side sill 2) is formed, on the upper face portion 21b, with a mounting hole 21d for mounting the partition member 4 to be described below. For example, the mounting hole 21d is composed of a circular hole with which a locking portion 47a of the partition member 4 engages.

<Inner Side Sill>

As shown in FIG. 4, the inner side sill 22 is joined via an inner center pillar 32 to the inner side in the vehicle width direction of the outer side sill 21. The inner side sill 22 is formed in substantially liner symmetry in vertical cross-sectional view with respect to the outer side sill 21, and thus a description of its shape and the like is omitted.

<Reinforcing Member>

Figure 2:
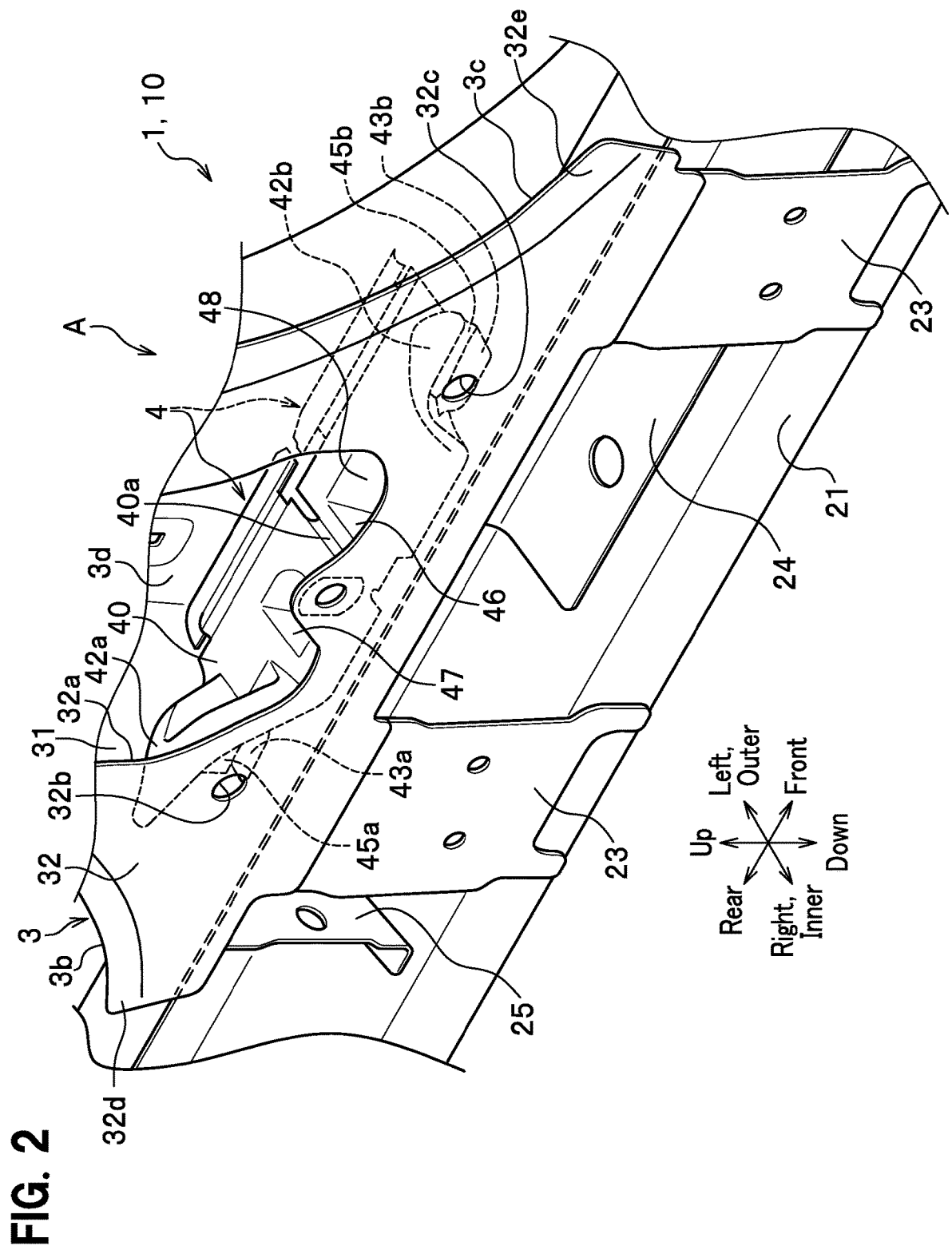
FIG. 2 is a schematic perspective view of the main parts at the lower portion of the center pillar.

As shown in FIG. 2, the reinforcing members 23, 24, and 25 are members for improving strength and bending rigidity in the vertical direction of the side sill 2. The reinforcing members 23, 24, 25 are made of a high-tensile steel plate or the like.

Figure 5:
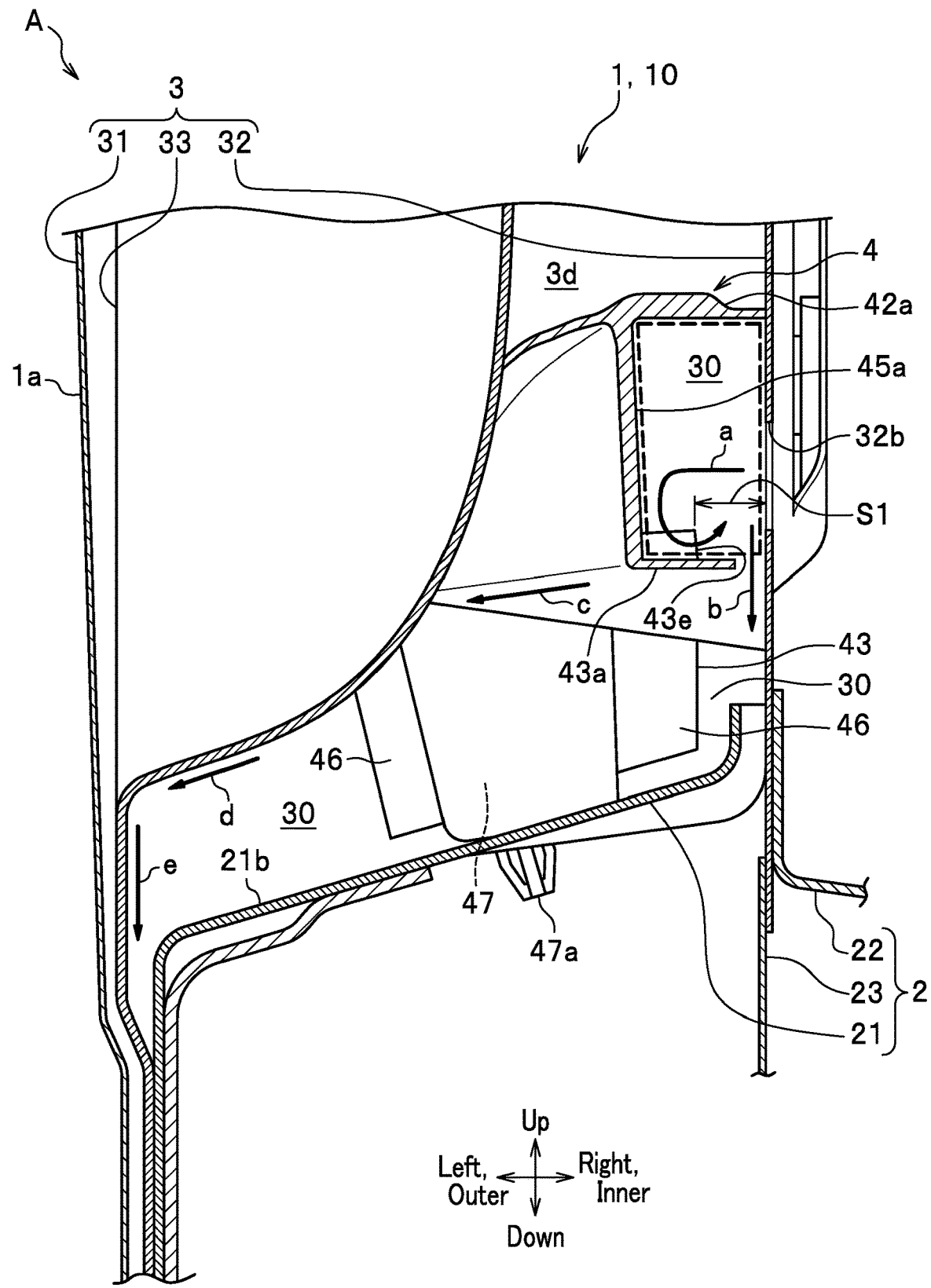
FIG. 5 is an enlarged cross-sectional view, taken along a line V-V in FIG. 1.

As shown in FIGS. 4 and 5, the reinforcing member 23 is a reinforcing gusset disposed between the metal plates of the outer side sill 21 and the inner side sill 22. The reinforcing member 23 is composed of two members disposed at front and rear lower portions of the center pillar 3 (see FIGS. 1 and 2). The upper end of the reinforcing member 23 is interposed and joined between the upper end of the outer side sill 21 and the upper end of the inner side sill 22, while the lower end of the reinforcing member 23 is interposed and joined between the lower end of the outer side sill 21 and the lower end of the inner side sill 22.

The reinforcing member 24 is a reinforcing gusset formed in a substantially U-shape in vertical cross section to follow the shape of the joined inner surface of the outer side sill 21 formed in a substantially U-shape in longitudinal cross section. The reinforcing member 24 extends in the front-rear direction on the inner wall of the outer side sill 21.

As shown in FIG. 2, the reinforcing member 25 is composed of a bulkhead disposed in, and orthogonal to, the outer side sill 21 extending in the front-rear direction and having a substantially U-shape in longitudinal cross section, like a juncture.

<<Center Pillar>>

As shown in FIG. 4, the center pillar 3 is a column-shaped hollow member partly forming the vehicle body side 1a. The center pillar 3 extends upward from a central portion in the front-rear direction of the side sill 2 to a roof side rail (not shown) (see FIG. 1). The center pillar 3 is formed of a tubular member having a hollow section 3d, in which a closed section is defined through joining of an outer center pillar 31, the inner center pillar 32, and a center pillar stiffener 33.

As shown in FIG. 1, the center pillar 3 is formed, at a lower portion thereof, with a base 3a formed in a fan shape spreading wider in the front-rear direction as it spreads downward in side view, and inwardly-curved corners 3b, 3c in an arc shape formed at front and rear outer peripheral portions of the base 3a. The center pillar 3 (inner center pillar 32) is formed, on an interior face thereof, with an opening 32a for installing a seat belt retractor (not shown) in the center pillar 3, and filling openings 32b and 32c (hereinafter, referred to as "a first filling opening" and "a second filling opening" as appropriate).

Note that the center pillar 3 has an upper half thereof, on an interior side thereof, covered with a pillar garnish (not shown) as an interior material. In addition, the opening 32a formed in a lower half of the center pillar 3 on the interior side and the seat belt retractor (not shown) are covered with a side lining (not shown).

<Filled Space>

As shown in FIG. 4, the filled space 30 is a space to be filled with an infill. The filled space 30 is defined between the inner center pillar 32 (inner panel) and the center pillar stiffener 33, and extends in the front-rear direction (see FIG. 1). As shown in FIG. 1, the filled space 30 is partitioned by a filled space partitioner 46 of the partition member 4 into a first filled space 30a on the rear side and a second filled space 30b on the front side. In other words, the filled space 30 includes two spaces of the first filled space 30a at one inwardly-curved corner 3b and the second filled space 30b formed at the other inwardly-curved corner 3c so as to have a volume substantially equal to that of the first filled space 30a.

<<Infill>>

The infill (not shown) is composed of a foaming material for structure. The infill is composed of so-called spray rubber (also called "spray foam," "liquid rubber," or "liquiform rubber"), for example, which is liquid at room temperature and becomes rubber when dried. The infill is expanded polyurethane foam having a fast setting property, for example, which is housed in a spray can and, when jetted out of the can, jets in a foam and cures to a sponge-like material. The solidified infill has features of a soundproof material, a vibration energy absorber, and an impact energy absorber. As shown in FIG. 4, the infill is filled and fixed in the filled space 30, to cause the lower portion in the hollow section 3d defined by the inner center pillar 32, the center pillar stiffener 33, and the upper face portion 21b of the outer side sill 21 to be sealed.

Alternatively, the infill may be a synthetic foam resin or a thermosetting foam resin that is formed into foam or a porous shape by heating. In addition, the infill may be a polyurethane having good adhesiveness to metal, or an adhesive having elasticity like a rubber made of silicone or the like.

<Outer Center Pillar>

As shown in FIG. 4, the outer center pillar 31 is a member forming an exterior face of the center pillar 3. The outer center pillar 31, the inner center pillar 32, and the center pillar stiffener 33 are each formed, for example, by pressing a flat plate member made of metal such as high-tensile steel. The outer center pillar 31 is formed into a hat shape in transverse section. The outer center pillar 31 extends upward, starting from the central portion of the outer face of the outer side sill 21.

<Inner Center Pillar>

As shown in FIG. 4, the inner center pillar 32 is a pillar half forming an interior face of the center pillar 3. The inner center pillar 32 extends upward, starting from the upper end of the reinforcing member 23. As shown in FIG. 1, the inner center pillar 32 is formed with the opening 32a, the filling openings 32b and 32c (first filling opening and second filling opening), and flange portions 32d and 32e.

The opening 32a is a retractor installation opening for installing a seat belt retractor (not shown). The opening 32a is composed of a substantially rectangular hole formed at a lower portion, on the inner side in the vehicle width direction, of the inner center pillar 32. A length in the front-rear direction of the opening 32a is formed longer than that of the partition member 4 when folded, as indicated by an imaginary line in FIG. 6. The partition member 4 is formed as such, to allow the partition member 4 folded in a substantially V shape, opening upward, to be inserted into the opening 32a.

As shown in FIGS. 1 and 2, the filling openings 32b and 32c are composed of two holes, the first filling opening formed on the front side of the lower end portion of the opening 32a and the second filling opening formed on the rear side of the lower end portion of the opening 32a. The filling openings 32b and 32c are supply ports for filling the filled space 30 (see FIGS. 4 and 5) in the center pillar 3 with the infill. The filling opening 32b (first filling opening) is composed of a round hole formed between the rear inwardly-curved corner 3b and the lower end portion of the opening 32a. The filling opening 32c (second filling opening) is composed of a round hole formed between the front inwardly-curved corner 3c and the lower end portion of the opening 32a. Note that the shapes of the filling openings 32b and 32c may be formed in accordance with the shape of the filling nozzle (not shown), and are not limited to the round holes.

As shown in FIGS. 1 and 2, the flange portions 32d and 32e are formed so as to zonally fringe edges in the front-rear direction of the inner center pillar 32 extending in the vertical direction.

<Center Pillar Stiffener>

As shown in FIGS. 4 and 5, the center pillar stiffener 33 is a plate member made of metal for reinforcement interposed between the outer center pillar 31 and the inner center pillar 32. The lower end of the center pillar stiffener 33 is joined to the outer side sill 21 of the side sill 2 and the outer center pillar 31.

<<Partition Member>>

As shown in FIG. 4, the partition member 4 is a member made of resin provided to vertically partition the lower portion in the hollow section 3d within the center pillar 3, between the outer center pillar 31 and the inner center pillar 32. The partition member 4 is provided on the upper face portion 21b of the outer side sill 21 (the upper face of the side sill 2) in the hollow section 3d within the center pillar 3 so as to define the filled space 30.

Figure 6:
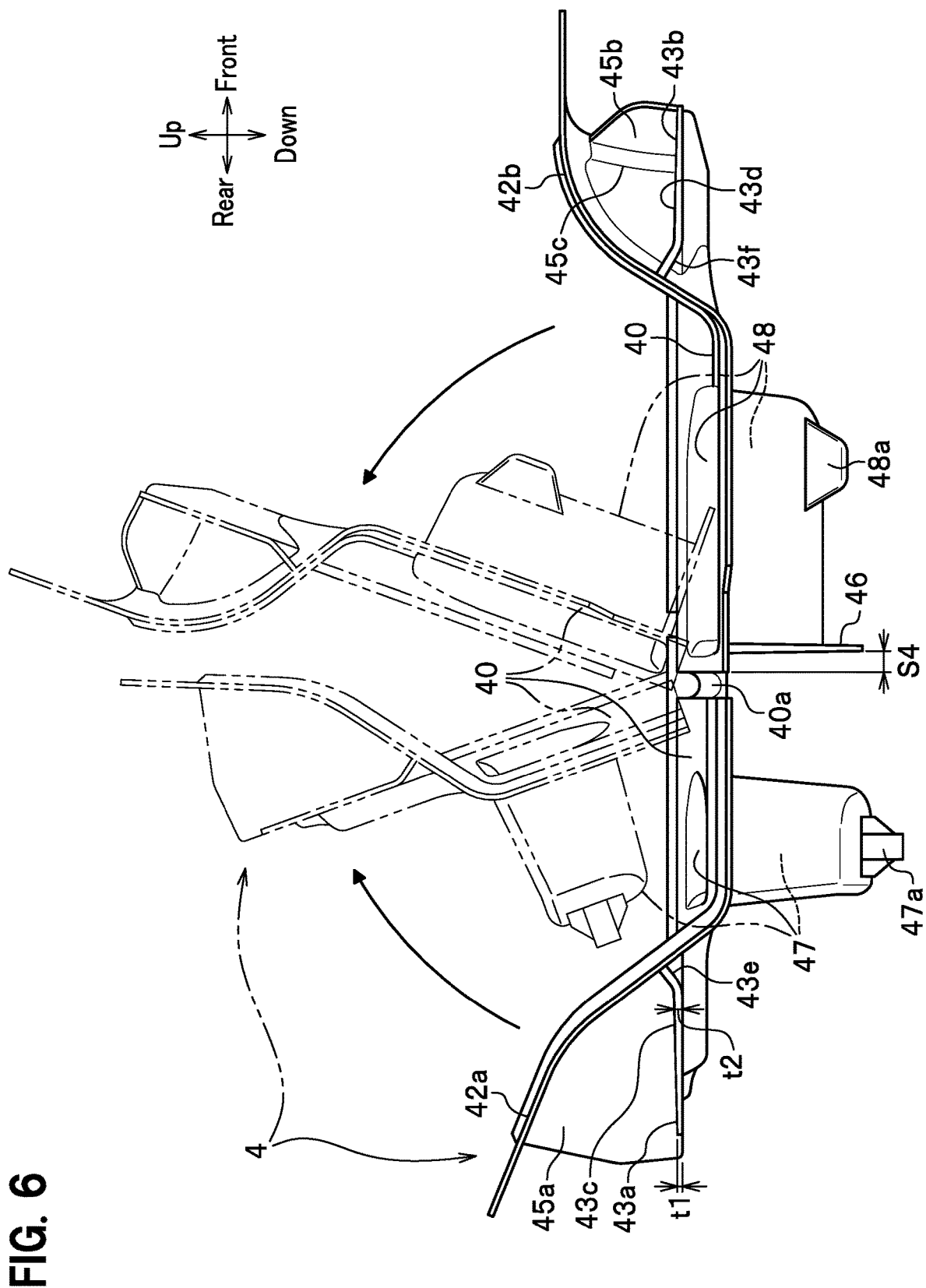
FIG. 6 is an enlarged side view of the partition member.
Figure 7:
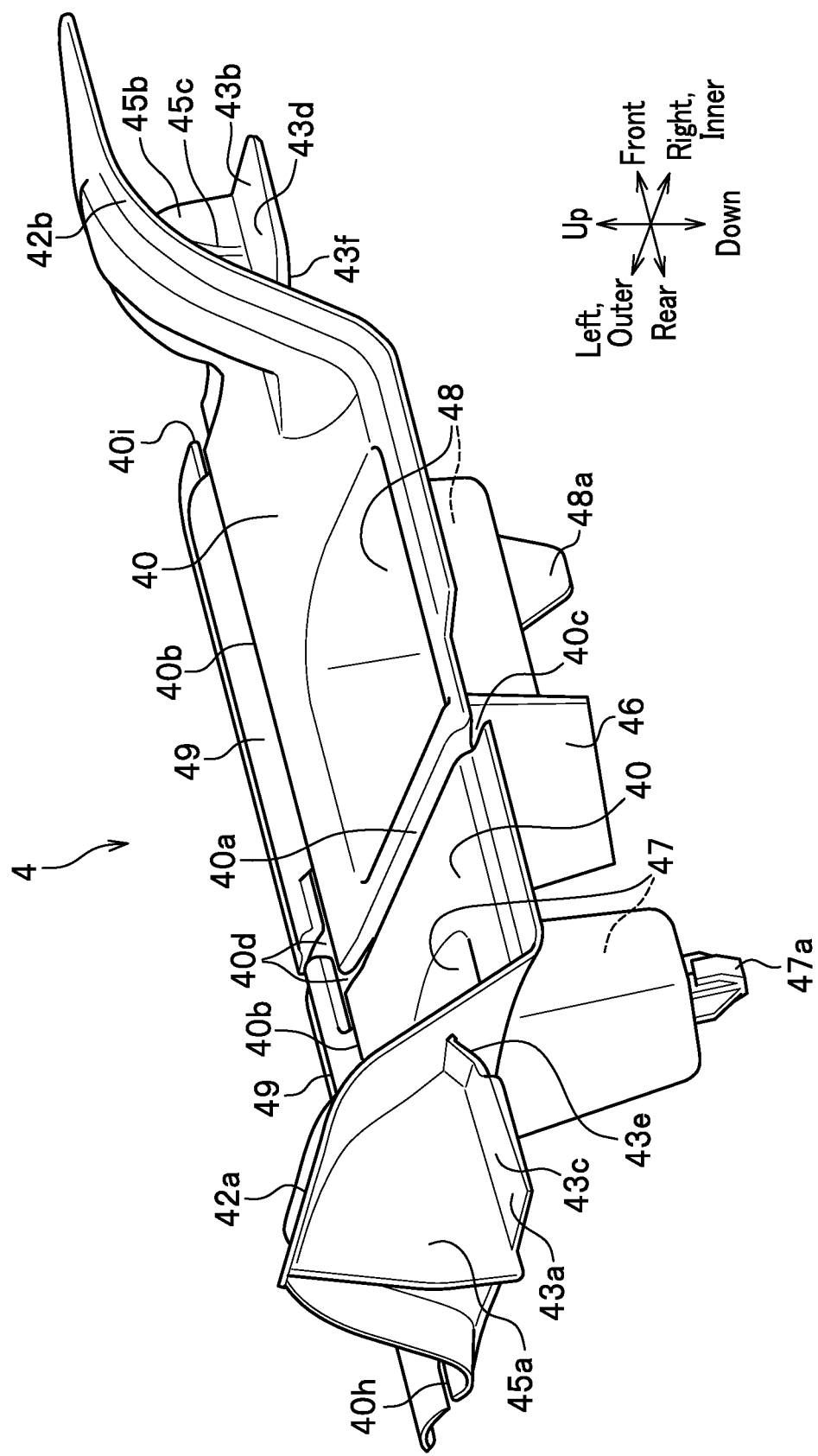
FIG. 7 is an enlarged perspective view of the partition member.
Figure 8:
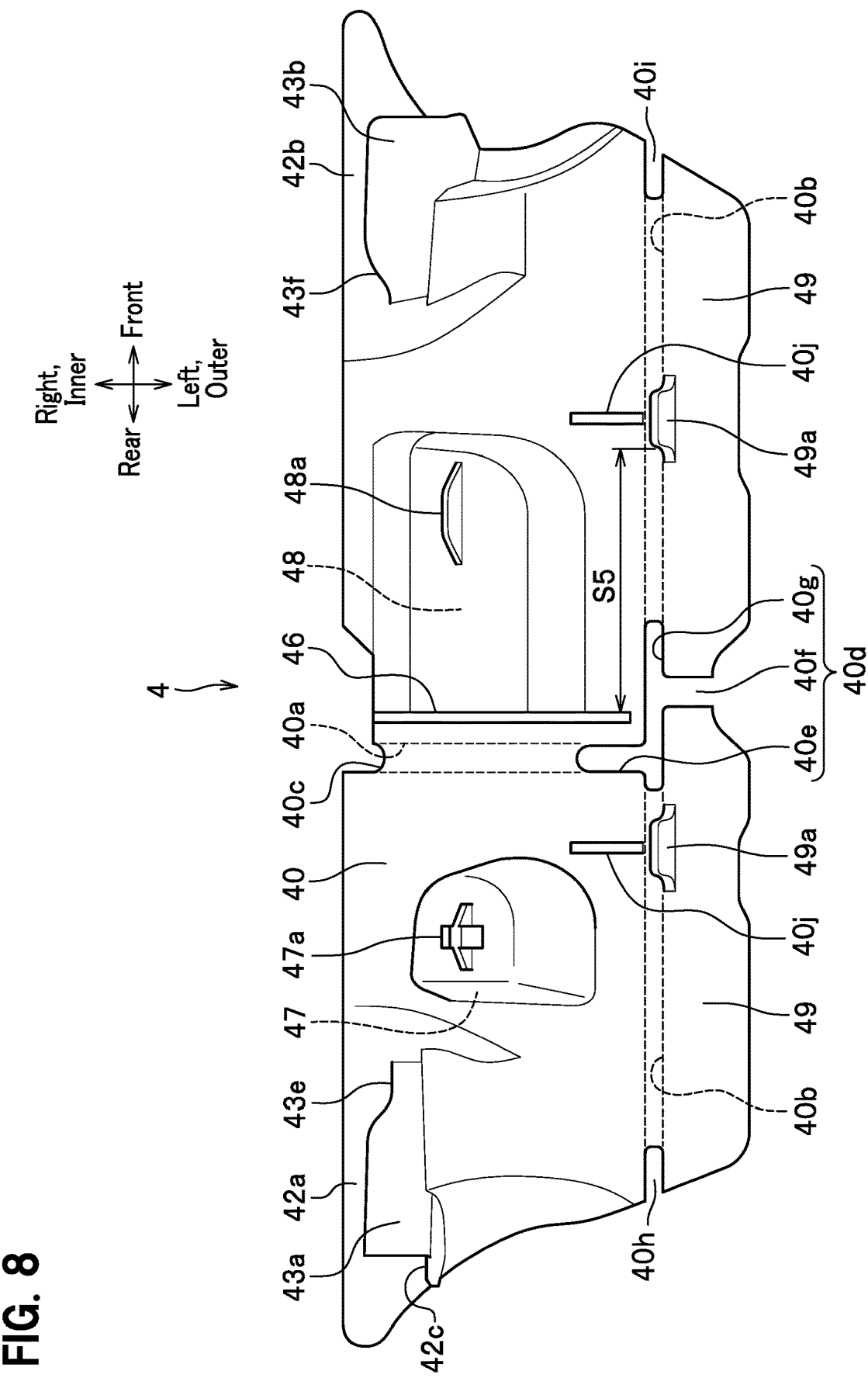
FIG. 8 is an enlarged perspective view of the partition member.

As shown in FIGS. 6 to 8, the partition member 4 includes a main body 40, a foldable portion 40a, a swinging portion 40b, filling control openings 41a and 41b, cover portions 42a and 42b, filling-opening receiving portions 43a and 43b, inclined portions 43c and 43d, cutout sections 43e and 43f, hard-to-fill sections 44a and 44b, guide portions 45a and 45b, a stepped portion 45c, a filled space partitioner 46, a recessed portion 47, a locking portion 47a, a recessed portion 48, a curved portion 49, and a restricting portion 49a.

<Main Body>

As shown in FIG. 1, the main body 40 is a flat plate-shaped portion extending in the front-rear direction along the upper face (upper face portion 21b) of the side sill 2. The main body 40 is disposed at a position lower than a lower opening edge of the opening 32a when the partition member 4 is installed in the hollow section 3d (see FIG. 4). Therefore, the partition member 4 works to prevent the infill filled in the filled space 30 from leaking through the opening 32a.

As shown in FIGS. 7 and 8, the foldable portion 40a extending in the right-left direction is formed at a central portion of the upper face of the main body 40. A laterally-inner cutout groove 40c is formed on the right side of the foldable portion 40a. A laterally-outer cutout groove 40d is formed on the left side of the foldable portion 40a. Therefore, the foldable portion 40a is formed to be easily bent. The recessed portions 47 and 48 are formed in front of and behind the foldable portion 40a of the main body 40. Therefore, the main body 40 is formed so as to surround the recessed portions 47 and 48. The cover portions 42a and 42b are formed at the front and rear ends on the inner side (right side) in the vehicle width direction of the main body 40.

Figure 9:
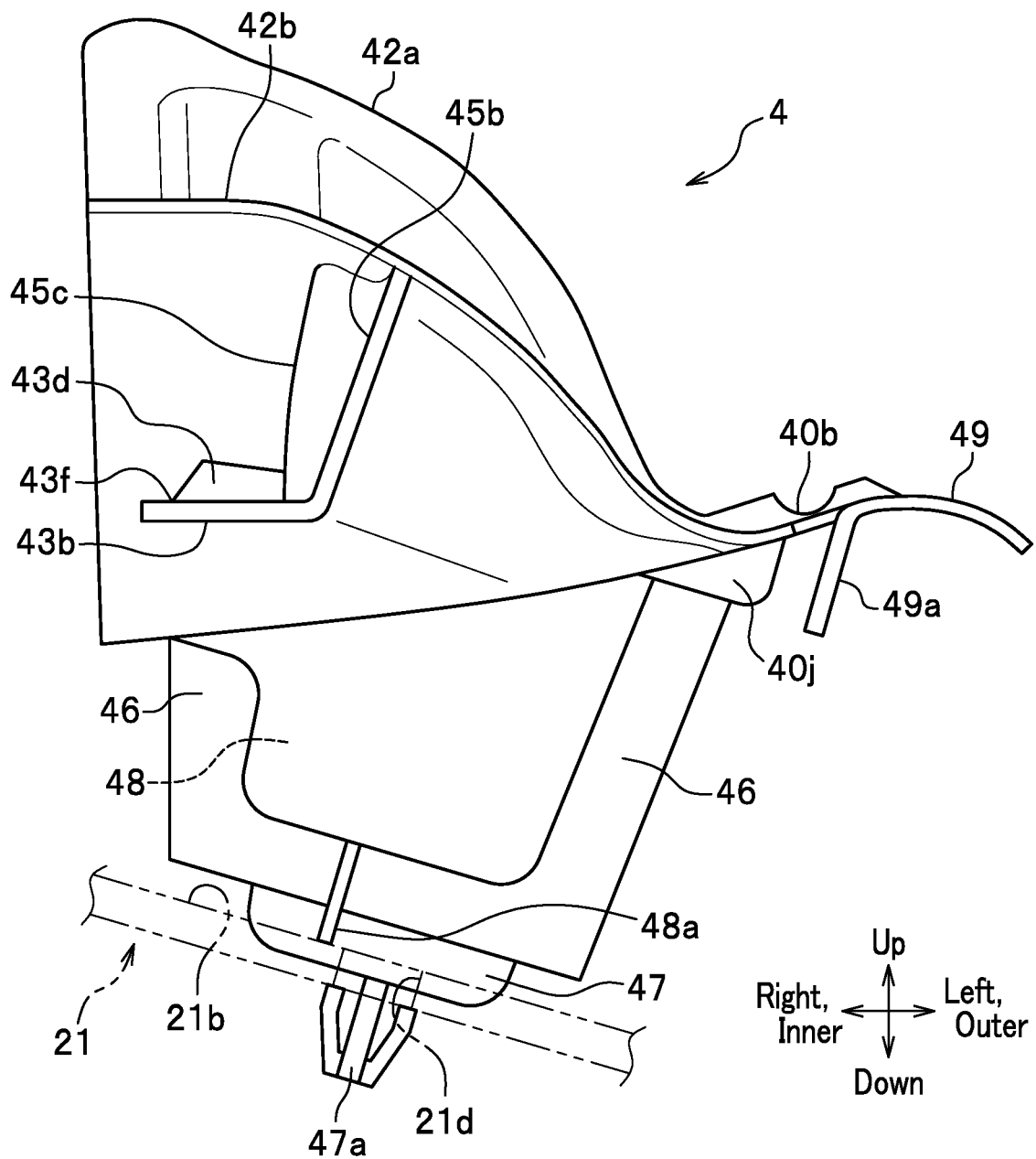
FIG. 9 is an enlarged front view of the partition member.

As shown in FIGS. 7 and 8, the curved portion 49 is formed on the outer side (left side) in the vehicle width direction of the upper face of the main body 40, intervened with the swinging portion 40b, a rear cutout groove 40h, and a front cutout groove 40i. As shown in FIG. 9, the filled space partitioner 46, outer faces of the recessed portions 47 and 48, the locking portion 47a, a protruding piece 48a, the restricting portions 49a, and a reinforcing protruding piece 40j protrude from the lower face of the main body 40.

<Cover Portion>

Figure 3:
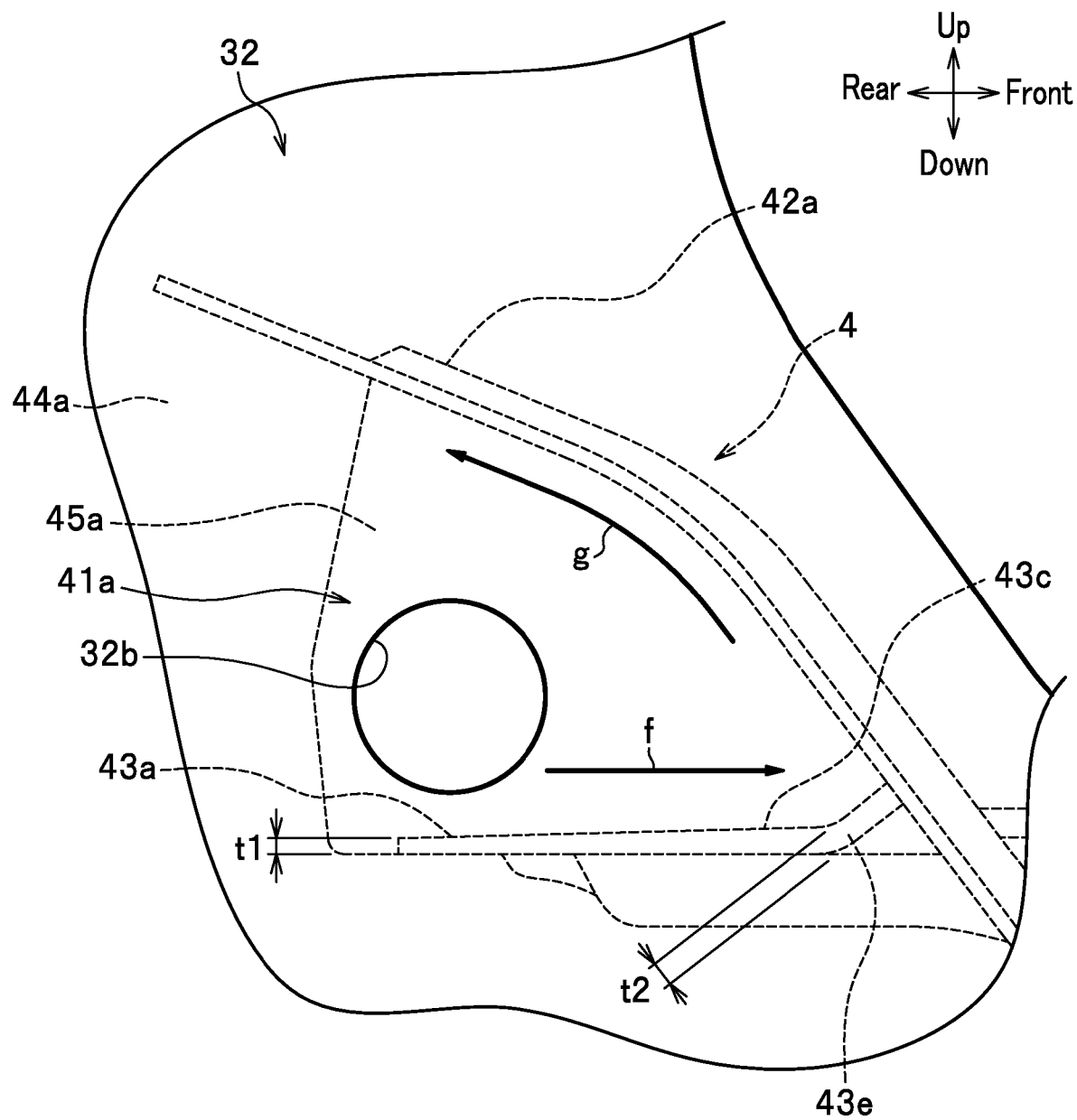
FIG. 3 is an enlarged side view of main parts of a partition member.

The cover portions 42a and 42b are portions for directing infill injected into the filled space 30 through the filling openings 32b and 32c to respectively flow toward the hard-to-fill sections 44a and 44b (direction indicated by an arrow g in FIG. 3). The cover portions 42a and 42b are composed of two front and rear members respectively facing the filling openings 32b and 32c. The rear cover portion 42a extends obliquely upward from the rear end of the main body 40 toward the rear hard-to-fill section 44a so as to cover over the filling opening 32b. The front cover portion 42b extends obliquely upward from the front end of the main body 40 toward the front hard-to-fill section 44b so as to cover over the filling opening 32c.

<Filling-Opening Receiving Portion>

As shown in FIGS. 1 and 2, the filling-opening receiving portions 43a and 43b are composed of plate-shaped portions to respectively receive the infill injected through the filling openings 32b and 32c at position below the filling openings 32b and 32c. The filling-opening receiving portions 43a and 43b respectively protrude from the lower ends of the guide portions 45a and 45b toward the filling openings 32b and 32c side (inner side in the vehicle width direction) (see FIG. 5). As shown in FIG. 5, the filling-opening receiving portions 43a and 43b (not shown) are off from the vehicle body frame 10 (inner center pillar 32).

<Inclined Portion>

As shown in FIGS. 6 and 7, the filling-opening receiving portions 43a and 43b are respectively formed with inclined portions 43c and 43d which extend in the front-rear direction of the vehicle body from the lower portions of the cover portions 42a and 42b and are inclined downward with the increasing distances from the lower portions of the cover portions 42a and 42b. The plate thicknesses of the filling-opening receiving portions 43a and 43b are formed to be thinner with the increasing distances from the lower portions of the cover portions 42a and 42b. That is, as shown in FIGS. 3 and 6, a plate thickness t1 of the rear end of the filling-opening receiving portion 43a and a plate thickness t1 (not shown) of the front end of the filling-opening receiving portion 43b are formed to be thinner than a plate thickness t2 of an end, closer to the cover portion 42a, of the filling-opening receiving portion 43a and a plate thickness t2 (not shown) of an end, closer to the cover portion 42b, of the filling-opening receiving portion 43b, respectively.

<Cutout Section>

As shown in FIGS. 7 and 8, the filling-opening receiving portions 43a and 43b are formed with cutout sections 43e and 43f which are each cut more widely in the vehicle width direction with the decreasing distances to the lower portions of the cover portions 42a and 42b. The cutout sections 43e and 43f are sections defining flow paths for the infill injected through the rear and front filling openings 32b and 32c to flow toward the central portion between the filling openings 32b and 32c so as to be easily filled.

The cutout sections 43e and 43f are formed in a crank shape in bottom view. The filling-opening receiving portions 43a and 43b have the cutout sections 43e and 43f, and thus are tapered toward the central portion between the filling openings 32b and 32c. This causes gaps 51 between the filling-opening receiving portions 43a and 43b and the vehicle body 1 (inner center pillar 32) to be large enough to cause the infill injected through the filling openings 32b and 32c to flow downward (direction indicated by an arrow b).

<Hard-to-Fill Section>

As shown in FIG. 1, the hard-to-fill sections 44a and 44b are sections which are not easily filled with the infill injected through the filling openings 32b and 32c. The hard-to-fill sections 44a and 44b are an upper rear end section of the first filling space 30a on the rear side and an upper front end section of the second filling space 30b on the front side. The hard-to-fill sections 44a and 44b are filled with the infill, injected through the filling openings 32b and 32c, directed by the filling-opening receiving portions 43a and 43b and the cover portions 42a and 42b so as to flow in the directions indicated by arrows f and g along the filling-opening receiving portions 43a and 43b and the cover portions 42a and 42b.

<Guide Portion>

As shown in FIGS. 2 and 5, the guide portions 45a and 45b are walls for guiding the infill injected through the filling openings 32b and 32c downward. The guide portions 45a and 45b are disposed on the outer sides in the vehicle width direction of the filling openings 32b and 32c so as to face the filling openings 32b and 32c over the filling space 30 and so as to cover the filling openings 32b and 32c from outside in the vehicle width direction.

As shown in FIGS. 6 and 7, the guide portions 45a and 45b are formed to extend downward from the lower faces of the cover portions 42a and 42b and support the cover portions 42a and 42b from below. The guide portions 45a and 45b are formed to extend from the lower faces of the cover portions 42a and 42b to the outer ends in the vehicle width direction of the filling-opening receiving portions 43a and 43b in the vehicle width direction. Therefore, the guide portions 45a and 45b also work as reinforcing members to reinforce the cover portions 42a and 42b and the filling-opening receiving portions 43a and 43b.

<Stepped Portion>

As shown in FIGS. 7 and 9, the stepped portion 45c is a portion for reinforcing the guide portion 45b on the front side. The stepped portion 45c is formed in the guide portion 45b between the filling-opening receiving portion 43b and the cover portion 42b so as to protrude inward in the vehicle width direction to have a stepped shape.

<Filled Space Partitioner>

As shown in FIG. 1, the filled space partitioner 46 is a protruding piece to partition the filled space 30 into the first filled space 30a at one inwardly-curved corner 3b and the second filled space 30b formed at the other inwardly-curved corner 3c so as to have a volume substantially equal to that of the first filling space 30a. A distance L1 between the filled space partitioner 46 and the filling opening 32b (first filling opening) is equal to a distance L2 between the filled space partitioner 46 and the filling opening 32c (second filling opening). As shown in FIGS. 4 and 5, the filled space partitioner 46 is composed of a plate-shaped partition plate extending toward the side sill 2 and the center pillar 3.

Note that the filled space partitioner 46 may not completely partition the filled space 30 in the vehicle width direction and may partially partition the filled space 30 in the vehicle width direction and the vertical direction, for example. For example, there may be gaps between the filled space partitioner 46 and the center pillar stiffener 33, between the filled space partitioner 46 and the center pillar inner 32, and between the filled space partitioner 46 and the side sill outer 21, through which the first filled space 30a and the second filled space 30b are continuous to each other. In this case, volumes of the first filled space 30a and the second filled space 30b are those when it is assumed that the filled space 30 is completely partitioned in the vehicle width direction at the position where the filled space partitioner 46 is provided.

As shown in FIG. 4, the filled space partitioner 46 is formed at a position off from the swinging portion 40b by a distance S2. In addition, the filled space partitioner 46 is formed at a position off from the restricting portion 49a by a distance S3. As shown in FIG. 6, the filled space partitioner 46 is formed at a position off from the foldable portion 40a by a distance S4. In addition, as shown in FIG. 8, the filled space partitioner 46 is provided adjacent to the rear of the recessed portion 48 and is formed at a position off from the restricting portion 49a by a distance S5.

<Recessed Portion>

As shown in FIG. 7, the recessed portions 47 and 48 are holes formed by recessing a part of the main body 40 downward to form a container-shaped protrusion protruding downward. As shown in FIG. 4, the recessed portion 47 on the rear side protrudes obliquely downward and inward in the vehicle width direction so as to be orthogonal to the inclined upper face portion 21*b* of the outer side sill 21. The lower face of the recessed portion 47 on the rear side (the tip end face of the container-shaped protrusion) is composed of an inclined face to closely contact with the upper face portion 21*b*. Protruded from the lower face of the recessed portion 47 is the locking portion 47*a* to engage with the mounting hole 21*d* of the outer side sill 21.

As shown in FIG. 9, the recessed portion 47 on the rear side protrudes obliquely downward and inward in the vehicle width direction so as to be orthogonal to the inclined upper face portion 21*b* of the side sill outer 21. The lower face of the recessed portion 48 on the front side (the tip end face of the container-shaped protrusion) is composed of an inclined face being parallel to the upper face portion 21*b*. Protruded from the lower face of the recessed portion 48 is the protruding piece 48*a* abutting on the upper face portion 21*b* of the outer side sill 21.

<Foldable Portion, Laterally-Inner Cutout Groove>

As shown in FIGS. 6 and 7, the foldable portion 40*a* is a resin hinge portion to allow the partition member 4 to be folded into a small shape passable through the opening 32*a* formed in the inner center pillar 32 (see FIG. 1). The foldable portion 40*a* is composed of a groove formed in a semicircular shape (U-shape) in side view. The foldable portion 40*a* is formed to be thin so that the partition member 4 can be folded into halves in the front-rear direction.

As shown in FIG. 8, the laterally-inner cutout groove 40*c* is cut out on the inner side in the vehicle width direction of the foldable portion 40*a*. The laterally-outer cutout groove 40*d* is cut out on the outer side in the vehicle width direction of the foldable portion 40*a*. Therefore, the partition member 4 is easily bent and deformed by the foldable portion 40*a*, the laterally-inner cutout groove 40*c*, and the laterally-outer cutout groove 40*d*.

<Laterally-Outer Cutout Groove>

As shown in FIG. 8, the laterally-outer cutout groove 40*d* is composed of a first lateral groove 40*e*, a front-rear groove 40*g*, and a second lateral groove 40*f*. The first lateral groove 40*e* is a groove cut out on the outer side in the vehicle width direction of the foldable portion 40*a*. The front-rear groove 40*g* is a groove cut out in the front-rear direction so as to be continuous from an outer-end opening in the vehicle width direction of the first lateral groove 40*e*. The second lateral groove 40*f* is a groove cut out on the outer side in the vehicle width direction of the front-rear groove 40*g* so as to be continuous from the front-rear groove 40*g* at a position offset in the front-rear direction with respect to the first lateral groove 40*e*.

<Swinging Portion, Front and Rear Cutout Grooves>

As shown in FIG. 4, the swinging portion 40*b* is a portion to cause the curved portion 49, which closes the gap with the inner wall of the center pillar stiffener 33, to be swingable. The swinging portion 40*b* is composed of a groove formed in an arc shape (semicircular shape) in longitudinal cross section. The swinging portion 40*b* extends in the front-rear direction on the outer side in the vehicle width direction of the main body 40. As shown in FIGS. 7 and 8, the rear cutout groove 40*h* and the front cutout groove 40*i* are formed at the rear and front ends of the swinging portion 40*b*. The laterally-outer cutout groove 40*d* is formed in a central portion of the swinging portion 40*b*.

<Curved Portion>

Having the swinging portion 40*b*, the rear cutout groove 40*h*, the front cutout groove 40*i*, and the laterally-outer cutout groove 40*d* causes the curved portion 49 formed on the outer side in the vehicle width direction of the swinging portion 40*b* to be elastically deformed easily in the vertical direction, as shown in FIG. 4. The curved portion 49 is an elastic member in a curved shape abutting on the wall of the center pillar stiffener 33 to eliminate a gap with the wall. The curved portion 49 has the second lateral groove 40*f* (see FIG. 8) formed at a central portion in the front-rear direction thereof, and is divided into front and rear halves in plan view.

<Restricting Portion>

As shown in FIG. 9, the restricting portion 49*a* is a protruding piece to restrict the bending angle of the swinging portion 40*b*. The restricting portion 49*a* protrudes downward from the lower face of the base end (inner end in the vehicle width direction) of the curved portion 49, along the filled space partitioner 46 and the recessed portion 47, in front view. As shown in FIG. 8, the restricting portion 49*a* is disposed at a position in vicinity, so as to be orthogonal in bottom view, to the reinforcing protruding piece 40*j*. Therefore, as shown in FIG. 9, when the curved portion 49 rotates downward about the swinging portion 40*b*, the restricting portion 49*a* abuts on the reinforcing protruding piece 40*j* to prevent the curved portion 49 from further rotating.

<Filling Control Opening>

As shown in FIG. 1, the filling control openings 41*a* and 41*b* are portions formed to cause the infill, injected through the filling openings 32*b* and 32*c*, to flow toward the hard-to-fill sections 44*a* and 44*b* (directions indicated by the arrows f, g) in the filled space 30, which are not easily filled with the infill. The filling control openings 41*a*, 41*b* are defined by the filling-opening receiving portions 43*a*, 43*b* and cover portions 42*a*, 42*b* arranged so as to surround the filling openings 32*b*, 32*c* formed in the center pillar 3 (vehicle body frame 10). The filling control opening 41*a* on the rear side is defined behind the lower end of the opening 32*a*. The filling control opening 41*b* on the front side is defined in front of the lower end of the opening 32*a*.

<<Advantageous Effects of Vehicle Body Side Part Structure>>

Next, the advantageous effects of the vehicle body side part structure A according to the embodiment of the present invention is described based on a procedure of assembly, with reference to FIGS. 1 to 9.

When the partition member 4 is installed in the hollow section 3*d* between the inner center pillar 32 and the center pillar stiffener 33 shown in FIG. 4, the partition member 4 is first bent so as to be folded into halves and reduced in size, as indicated by two-dot chain lines in FIG. 6. Next, the folded partition member 4 is inserted into the hollow section 3*d* through the opening 32*a* shown in FIG. 2. The folded partition member 4 has the length in the front-rear direction thereof smaller than the width in the front-rear direction of the opening 32*a*. Therefore, the partition member 4 can be easily inserted through the opening 32*a* for installation.

Next, the partition member 4 is developed into a normal condition, to have the locking portion 47*a* pushed into, and engaged with, the mounting hole 21*d*, and the protruding piece 48*a* abutted on the upper face portion 21*b* of the outer side sill 21, as shown in FIGS. 4 and 9.

Subsequently, liquid infill (not shown) is injected through the filling openings 32*b* and 32*c* shown in FIG. 1, to flow the infill into the filled space 30 (the first filled space 30*a* and the second filled space 30*b*). In the vicinities below the filling openings 32*b* and 32*c*, the filling-opening receiving portions 43a and 43b are provided. In addition, in the vicinities above the filling openings 32b and 32c, the cover portions 42a and 42b are provided.

Therefore, the infill injected through the filling openings 32b and 32c hit the guide portions 45a and 45b disposed to face the filling openings 32b and 32c and flows toward areas above the filling-opening receiving portions 43a and 43b (in a direction indicated by an arrow a in FIG. 5). Then, the infill partly flows downward (in directions indicated by arrows b, d, and e).

In addition, as shown in FIG. 1, the infill flowing onto the filling-opening receiving portions 43a and 43b flows frontward and rearward along the filling-opening receiving portions 43a and 43b. The infill flowing on the filling-opening receiving portions 43a and 43b toward an area below the opening 32a (in a direction indicated by an arrow f) is guided by the lower faces of the cover portions 42a and 42b to flow toward the hard-to-fill sections 44a and 44b (in a direction indicated by an arrow g) along the lower faces of the cover portions 42a and 42b. This makes the infill flow to the hard-to-fill sections 44a and 44b.

The infill flowing to the hard-to-fill sections 44a and 44b is guided by the inwardly-curved corners 3b and 3c and flows to the rear end portion of the first filled space 30a and the front end portion of the second filled space 30b along the inwardly-curved corners 3b and 3c. With the filled space 30 defined as such, the first filled space 30a and the second filled space 30b are entirely filled with the infill.

The infill, when dried, is cured to a rubber-like state, to close and seal the space between the partition member 4 at the lower portion in the hollow section 3d and the upper face portion 21b of the outer side sill 21. Therefore, even if a wind noise is generated with rushing air hitting a through hole (not shown) or the like in the lower face of the outer side sill 21 or a road noise is generated due to the tires contacting with the road surface, while the vehicle is traveling, the infill blocks and absorbs the wind noise and the road noise. As a result, the infill prevents the wind noise and road noise from being transmitted to the inside of the cabin (vehicle interior) via the center pillar 3.

As shown in FIGS. 4 and 5, the center pillar stiffener 33 is interposed between the outer center pillar 31 and the inner center pillar 32, and the infill and the partition member 4 are provided on the upper face portion 21b of the outer side sill 21. Therefore, the inner center pillar 32 is always kept by the outer side sill 21, the infill, and the partition member 4 to have a constant distance from the center pillar stiffener 33, to allow for having improved strength. As a result, the inner center pillar 32 is compensated for local lack of strength due to the opening 32a.

As described above, the vehicle body side part structure A according to the present invention, as shown in FIGS. 1 to 5, includes: the center pillar 3 having the base 3a to expand in a fan shape; the inner panel (inner center pillar 32) partly forming the center pillar 3 and having the filling openings 32b and 32c formed in vicinity to the front and rear inwardly-curved corners 3b and 3c of the base 3a; the center pillar stiffener 33 partly forming the center pillar 3, disposed exterior to the inner center pillar 32, and defining the filled space 30 to extend in the front-rear direction between the center pillar stiffener 33 and the inner center pillar 32, the side sill 2 joined to the lower ends of the inner center pillar 32 and the center pillar stiffener 33; and the partition member 4 disposed above the side sill 2 in the filled space 30 and having front and rear cover portions 42a and 42b to face the filling openings 32b and 32c and the main body 40 integrated with the cover portions 42a and 42b, wherein the partition member 4 includes the filled space partitioner 46 to partition the filled space 30 into the first filled space 30a located closer to the inwardly-curved corner 3b and the second filled space 30b located closer to the other inwardly-curved corner 3c so as to have a volume substantially equal to that of the first filled space 30a.

According to such a configuration, the filled space 30 of the vehicle body side part structure A of the present invention is partitioned by the filled space partitioner 46 into the first filled space 30a closer to the inwardly-curved corner 3b and the second filled space 30b closer to the other inwardly-curved corner 3c having a volume substantially equal to that of the first filled space 30a. Therefore, the filled space 30 is partitioned by the filled space partitioner 46 into two spaces in the front-rear direction, and this causes the infill to be blocked from flowing from the first filled space 30a into the second filled space 30b and vice versa. In addition, the injected infill hits the front and rear cover portions 42a and 42b facing the filling openings 32b and 32c and is guided by the cover portions 42a and 42b to flow accordingly, and this causes the hard-to-fill sections 44a and 44b at the upper end portion in the filled space 30 to be easily filled. This allows the infill to flow into every corner of the filled space 30 such as a minute space between the upper end portions of the cover portions 42a and 42b and the inwardly-curved corners 3b and 3c. Therefore, the present invention improves the soundproof property of the vehicle body 1.

Further, as shown in FIGS. 1 to 5, the filled space partitioner 46 is a plate-shaped partition plate extending from the main body 40 toward the side sill 2 and the center pillar stiffener 33.

According to such a configuration, the filled space partitioner 46 is a partition plate extending from the main body 40 toward the side sill 2 and the center pillar stiffener 33, and this allows for partitioning the filled space 30 with minimum influence on the filled space 30. This allows the infill to flow into minute gaps between the upper end portions of the cover portions 42a and 42b and the inwardly-curved corners 3b and 3c, without reducing the filled space 30 in size. Therefore, the present invention improves the soundproof property of the vehicle body 1.

Still further, as shown in FIG. 2, FIG. 6, or FIG. 7, the partition member 4 includes the main body 40, and recessed portions 47 and 48 formed by partly recessing the main body 40 downward, wherein the main body 40 is formed so as to surround the recessed portions 47 and 48.

According to such a configuration, the partition member 4 includes the main body 40 which surrounds the container-shaped recessed portions 47 and 48 formed with the main body 40 partially recessed downward, and thus the main body 40 is strengthened by the recessed portions 47 and 48 and is prevented from being deformed by the foaming agent. This prevents minute gaps between the upper end portions of the cover portions 42a and 42b and the inwardly-curved corners 3b and 3c from being deformed by the infill, to allow the infill to reliably enter every corner of the filled space 30. Therefore, the present invention improves the soundproof property of the vehicle body 1.

Still further, as shown in FIG. 1, the filling openings 32b and 32c work as the first filling opening and second filling opening, respectively.

According to such a configuration, the filling openings 32b and 32c respectively work as the first filling opening and second filling opening, to allow the infill to quickly fill every corner of the filled space 30 extending in the front-rear direction of the vehicle body. This results in the infill filling the entire filled space 30 before being cured. Therefore, the present invention improves the soundproof property of the vehicle body 1.

Still further, as shown in FIG. 1, the distance L1 between the filled space partitioner 46 and the first filling opening (filling opening 32b) is equal to the distance L2 between the filled space partitioner 46 and the second filling opening (filling opening 32c).

According to such a configuration, the first filled space 30a and the second filled space 30b are partitioned such that the distance L1 between the filled space partitioner 46 and the first filling opening (filling opening 32b) and the distance L2 between the filled space partitioner 46 and the second filling opening (filling opening 32c) are equal to each other. This allows for forming the volume of the first filled space 30a equal to the volume of the second filled space 30b. As a result, the infill enter minute spaces enclosed by the upper end portion of the cover portion 42a, the inwardly-curved corner 3b, and the inner center pillar 32, which are closer to the first filling opening (filling opening 32b), and enclosed by the upper end portion of the cover portion 42b, the inwardly-curved corner 3c, and the inner center pillar 32, which are closer to the second filling opening (filling opening 32c). Therefore, the infill fills every corner of the filled space 30, to improve the soundproof property of the vehicle body 1.

Still further, as shown in FIGS. 6 to 8, the partition member 4 includes the foldable portion 40a to allow the partition member 4 to be folded into a shape passable through the opening 32a formed in the inner panel (inner center pillar 32), and the filled space partitioner 46 is off from the foldable portion 40a.

According to such a configuration, the partition member 4 includes the foldable portion 40a so as to be folded into a smaller size passable through the opening 32a of the inner center pillar 32. Besides, the filled space partitioner 46 is off from the foldable portion 40a, to allow the partition member 4, when folded to pass through the opening 32a, to be inserted without the filled space partitioner 46 hitting the opening 32a and thus getting damaged. Therefore, the infill does not leak through the partition member 4, to allow the infill to enter minute spaces enclosed by the upper end portion of the cover portion 42b and the inwardly-curved corner 3c in the filled space 30, and the inner center pillar 32, and enclosed by the upper end portion of the cover portion 42a and the inwardly-curved corner 3b in the filled space 30, and the inner center pillar 32. Therefore, the present invention improves the soundproof property of the vehicle body 1.

Still further, as shown in FIG. 4, the main body 40 is provided, on the outer side in the vehicle width direction thereof, with the swinging portion 40b to cause the curved portion 49, which closes the gap with the inner wall of the center pillar stiffener 33, to be swingable, and the filled space partitioner 46 is off from the swinging portion 40b.

According to such a configuration, the main body 40 is provided, on the outer side in the vehicle width direction thereof, with the swinging portion 40b to cause the curved portion 49 to be swingable, to allow the curved portion 49 to be elastically pressed against the inner wall of the center pillar stiffener 33 to eliminate the gap. Therefore, the infill in the filled space 30 is prevented from leaking through the gap. Besides, the filled space partitioner 46 is off from the swinging portion 40b, and this prevents the distal end of the curved portion 49 from being damaged when the partition member 4 is installed, so that the partition member 4 is disposed to have no gap with the center pillar stiffener 33.

Even with the filled space partitioner 46, the partition member 4 is disposed to abut on the center pillar stiffener 33, to prevent the infill from leaking through the partition member 4. This allows the infill to enter minute spaces enclosed by the upper end portion of the cover portion 42b and the inwardly-curved corner 3c in the filled space 30, and the inner center pillar 32, and enclosed by the upper end portion of the cover portion 42a and the inwardly-curved corner 3b in the filled space 30, and the inner center pillar 32. Therefore, the present invention improves the soundproof property of the vehicle body 1.

Still further, as shown in FIG. 4, the curved portion 49 includes a restricting portion 49a to restrict the bending angle of the swinging portion 40b, and the restricting portion 49a is disposed off from the filled space partitioner 46 so as to abut on the filled space partitioner 46 when the curved portion 49 swings beyond a predetermined range.

According to such a configuration, the curved portion 49 includes the restricting portion 49a to restrict the bending angle of the swinging portion 40b, and the restricting portion 49a is disposed off from, but may abut on, the filled space partitioner 46, to prevent the curved portion 49 from being damaged. The partition member 4 has the curved portion 49 protruded to reliably abut on the center pillar stiffener 33, with the restricting portion 49a restricting the swinging portion 40b, to eliminate the gap between the curved portion 49 and the center pillar stiffener 33. This prevents the infill from leaking through the gap, to allow the infill to enter minute spaces in the filled space 30, enclosed by the upper end portion of the cover portion 42a, the inwardly-curved corner 3b, and the inner center pillar 32 and enclosed by the upper end portion of the cover portion 42b, the inwardly-curved corner 3c, and the center pillar inner 32. Therefore, the present invention improves the soundproof property of the vehicle body 1.

First Modification

Figure 10:
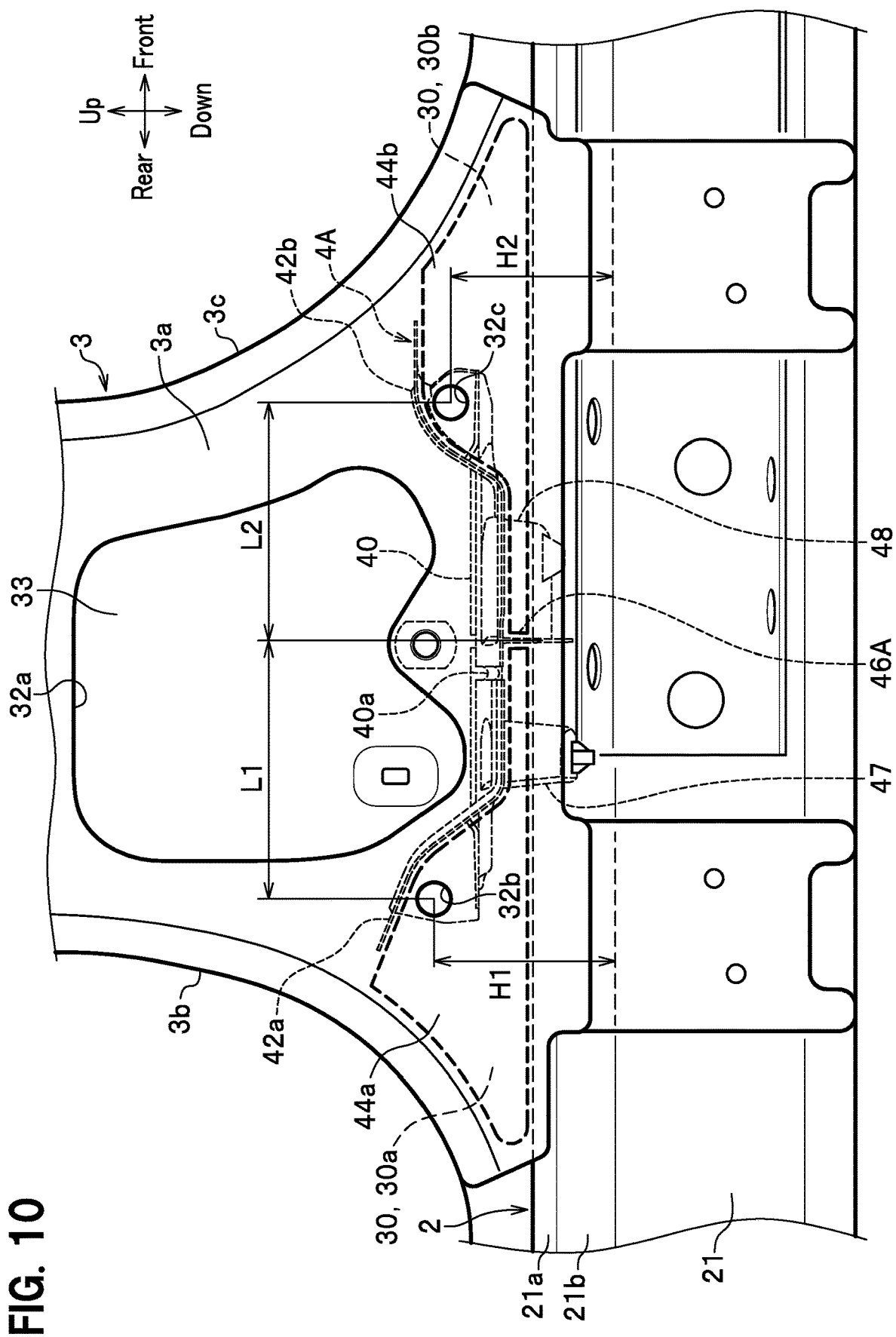
FIG. 10 is a schematic side view of a first modification of the vehicle body side part structure according to the embodiment of the present invention, to show main parts at the lower portion of the center pillar.

Note that the present invention is not limited to the above embodiment and various alterations and modifications are possible within the scope of the technical ideas, and the present invention obviously covers such altered and modified inventions. FIG. 10 is a schematic side view of a first modification of the vehicle body side part structure A according to the embodiment of the present invention, to show main parts at the lower portion of the center pillar 3.

In the embodiment described above, the filled space partitioner 46, in which the volume of the first filled space 30a is substantially equal to that of the second filled space 30b as shown in FIG. 1, has been described as an example, but the present invention is not limited thereto. As shown in FIG. 10, a filled space partitioner 46A may be disposed at a position closer to a larger one of the first filled space 30a and the second filled space 30b.

In this case, the filled space partitioner 46A may be shifted frontward, for instance. The distance L1 between the filled space partitioner 46A and the first filling opening (filling opening 32b) is set longer than the distance L2 between the filled space partitioner 46A and the second filling opening (filling opening 32c) so as to be unequal to the distance L2. As a result, the volume of the first filled space 30a is adjusted to be larger than that of the second filled space 30b. Alternatively, in contrast to the above-described case, the filled space partitioner 46A may be shifted rearward to have the distance L1 between the filled space partitioner 46A and the first filling opening (filling opening 32b) shorter than the distance L2 between the filled space partitioner 46A and the second filling opening (filling opening 32c).

According to such a configuration, the distance L1 is set unequal to the distance L2, to have the filled space partitioner 46A disposed at a position closer to the larger one of the first filled space 30a closer to the first filling opening (filling opening 32b) and the second filled space 30b closer to the second filling opening (filling opening 32c). Therefore, even when the filled space 30 is defined to be shifted away from the filling openings 32b and 32c or expanded in the vehicle front-rear direction, the volume of the first filled space 30a can be equalized to that of the second filled space 30b. The volume of the first filled space 30a is equalized to that of the second filled space 30b by adjusting the position of the filled space partitioner 46A. Equalizing the volume of the first filled space 30a to that of the second filled space 30b facilitates the infill entering minute spaces (hard-to-fill sections 44a, 44b) between the upper ends of the cover portions 42a and 42b and the inwardly-curved corners 3c and 3b. This allows the infill to fill the filled space 30 with no space. Therefore, the present invention improves the soundproof property of the vehicle body 1.

In addition, as shown in FIG. 10, a vertical distance H1 between the upper face (upper face portion 21b) of the side sill 2 and the first filling opening (filling opening 32b) may be unequal to a vertical distance H2 between the upper face portion 21b of the side sill 2 and the second filling opening 32c, and the filled space partitioner 46A may be shifted toward one of the first filling opening (filling opening 32b) and the second filling opening (filling opening 32c), having a narrower one of the vertical distances H1 and H2.

According to such a configuration, the distance H1 from the upper face portion 21b of the side sill 2 to the first filling opening (filling opening 32b) is unequal to the distance H2 from the upper face portion 21b of the side sill 2 to the second filling opening (filling opening 32c). This causes the filled space partitioner 46A to be shifted toward one of the first filling opening (filling opening 32b) and the second filling opening (filling opening 32c), having a narrower one of the distance H1 and the distance H2 from the upper face portion 21b of the side sill 2. The filled space 30 having a narrower one of the distance H1 and the distance H2 is tapered, to be less filled with the infill. Shifting the filled space partitioner 46A toward the tapered filled space 30 (the first filled space 30a or the second filled space 30b) facilitates the infill entering far reach of the tapered shape. Adjusting the position of the filled space partitioner 46A according to the shape of the filled space 30 allows the infill to be evenly injected throughout the first filled space 30a and the second filled space 30b. This causes the first filled space 30a and the second filled space 30b to have the infill flowing into minute spaces (hard-to-fill sections 44a, 44b) between the upper ends of the cover portions 42a and 42b, the inwardly-curved corners 3c and 3b, and the inner center pillar 32, so that the filled space 30 is filled with the infill with no space. Therefore, the present invention improves the soundproof property of the vehicle body 1.

Second Modification

Figure 11:
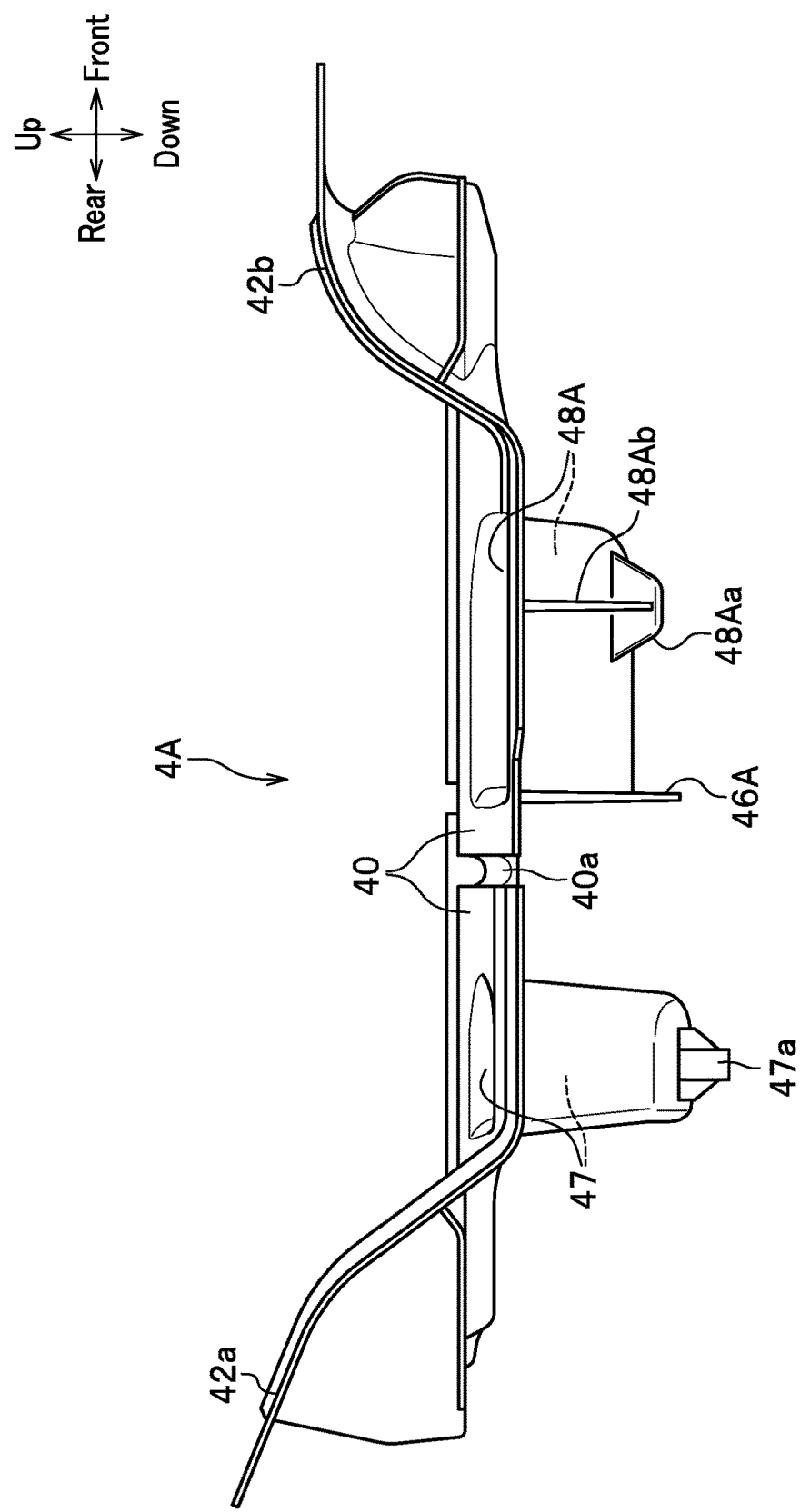
FIG. 11 is an enlarged side view of a partition member of a second modification of the vehicle body side part structure according to the embodiment of the present invention.

FIG. 11 is an enlarged side view of a partition member 4A of a second modification of the vehicle body side part structure A according to the embodiment of the present invention.

In addition, as shown in FIG. 11, a recessed portion 48A may be formed, on an outer peripheral face between the lower face of the main body 40 and a protruding piece 48Aa or an outer peripheral face of other portions, with a rib 48Ab. This causes the protruding piece 48Aa to be reinforced by the rib 48Ab so as not to be bent.

Other Modifications

For example, the inner center pillar 32 shown in FIGS. 1 and 4 described in the above embodiment and the inner panel described in one or more claims are not limited to the center pillar 3, and may be an inner side sill of the side sill 2. In this case, the inner center pillar 32 and the inner side sill 22 may be formed to have an inverted T-shape in side view, to have the inner side sill 22 and the lower portion of the inner center pillar 32 shown in FIGS. 4 and 5 integrally formed.

In addition, the outer side sill 21 shown in FIGS. 4 and 5 can be any panel member extending from the lower end portion of the inner center pillar 32 to an outer end in the width direction of the vehicle, such as a side sill stiffener.

LIST OF REFERENCE SIGNS

1: vehicle body, 2: side sill, 3: center pillar, 3a: base, 3b; 3c: inwardly-curved corner, 4; 4A: partition member, 21: outer side sill, 30: filled space, 30a: first filled space, 30b: second filled space, 32: inner center pillar (inner panel), 32a: opening, 32b: filling opening (first filling opening), 32c: filling opening (second filling opening), 33: center pillar stiffener, 40: main body, 40a: foldable portion, 40b: swinging portion, 42a; 42b: cover portion, 46; 46A: filled space partitioner, 47; 48: recessed portion, 49: curved portion, 49a: restricting portion, A: vehicle body side part structure, H1: vertical distance between upper face of side sill and first filling opening, H2: vertical distance between upper face of side sill and second filling opening, L1: distance between filled space partitioner and first filling opening, and L2: distance between filled space partitioner and second filling opening.

What is claimed is:

1. A vehicle body side part structure comprising:
a center pillar having a base to expand in a fan shape;
an inner panel partly forming the center pillar and having filling openings formed in vicinity to front and rear inwardly-curved corners of the base;
a center pillar stiffener partly forming the center pillar, disposed exterior to the inner panel, and defining a filled space to extend in a front-rear direction between the center pillar stiffener and the inner panel;
a side sill joined to lower ends of the inner panel and the center pillar stiffener; and
a partition member disposed above the side sill in the filled space and having front and rear cover portions to face the filling openings and a main body integrated with the cover portions,
wherein the partition member includes a filled space partitioner to partition the filled space into a first filled space located closer to one of the inwardly-curved corners and a second filled space located closer to the other of the inwardly-curved corners so as to have a volume substantially equal to that of the first filled space.

2. The vehicle body side part structure according to claim 1, wherein
the filled space partitioner is composed of a plate-shaped partition plate extending toward the side sill and the center pillar.

3. The vehicle body side part structure according to claim 1, wherein
the partition member includes the main body, and recessed portions formed by partly recessing the main body downward, wherein the main body is formed so as to surround the recessed portions.

4. The vehicle body side part structure according to claim 1, wherein
the filling openings work as a first filling opening and a second filling opening.

5. The vehicle body side part structure according to claim 4, wherein
a distance between the filled space partitioner and the first filling opening is equal to a distance between the filled space partitioner and the second filling opening.

6. The vehicle body side part structure according to claim 4, wherein
a vertical distance between an upper face of the side sill and the first filling opening is unequal to a vertical distance between the upper face of the side sill and the second filling opening, and
the filled space partitioner is shifted toward one of the first filling opening and the second filling opening, having a narrower one of the vertical distances.

7. The vehicle body side part structure according to claim 4, wherein
the filled space partitioner is disposed at a position closer to a larger one of the first filled space and the second filled space.

8. The vehicle body side part structure according to claim 1, wherein
the partition member includes a foldable portion to allow the partition member folded into a shape passable through an opening formed in the inner panel, and
the filled space partitioner is off from the foldable portion.

9. The vehicle body side part structure according to claim 1, wherein
the main body is provided, on an outer side in the vehicle width direction thereof, with a swinging portion to cause a curved portion thereof, which closes a gap with an inner wall of the center pillar stiffener, to be swingable, and
the filled space partitioner is off from the swinging portion.

10. The vehicle body side part structure according to claim 9, wherein
the curved portion includes a restricting portion to restrict a bending angle of the swinging portion, and
the restricting portion is disposed off from the filled space partitioner so as to abut on the filled space partitioner when the curved portion swings beyond a predetermined range.

* * * * *